March 5, 1968   P. S. ANDERSON   3,371,532
TEMPERATURE-COMPENSATING CRANK ASSEMBLY FOR GAS METERS
Filed Aug. 17, 1965   3 Sheets-Sheet 1
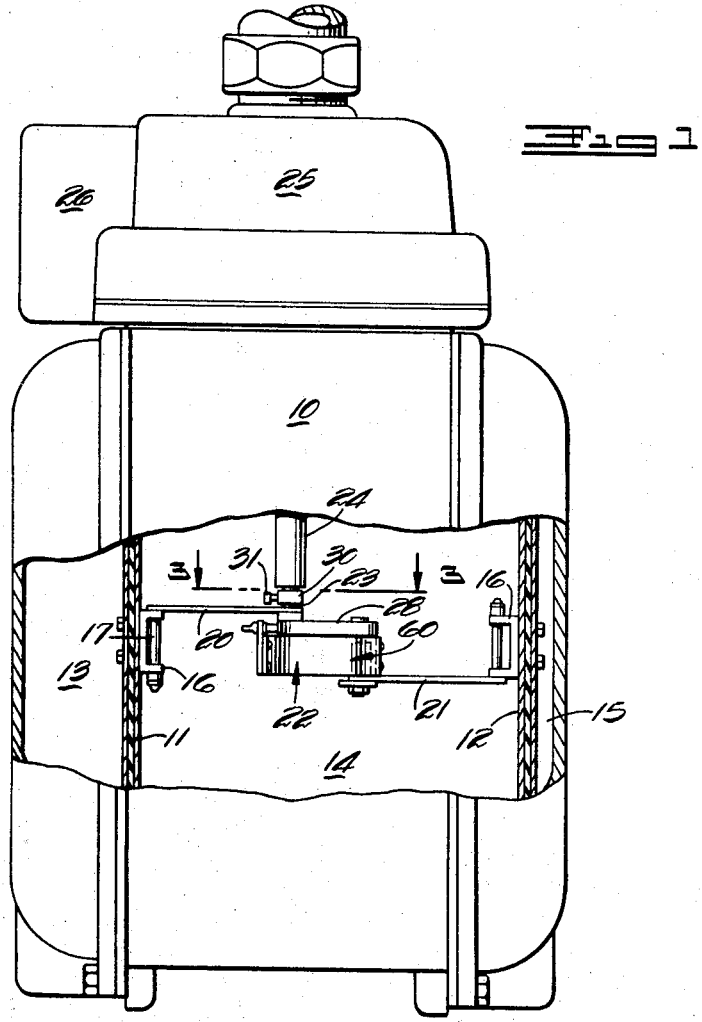
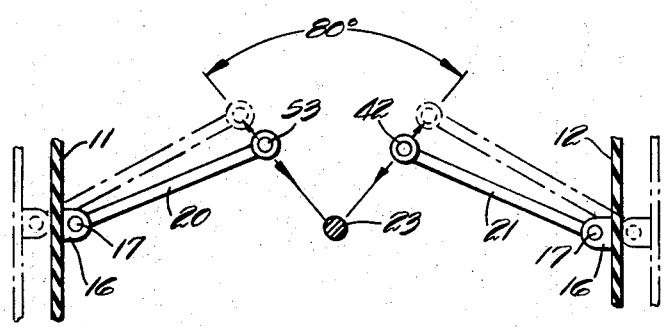
INVENTOR.
PARKER S. ANDERSON
BY
MAHONEY, MILLER & RAMBO
BY
ATTORNEYS

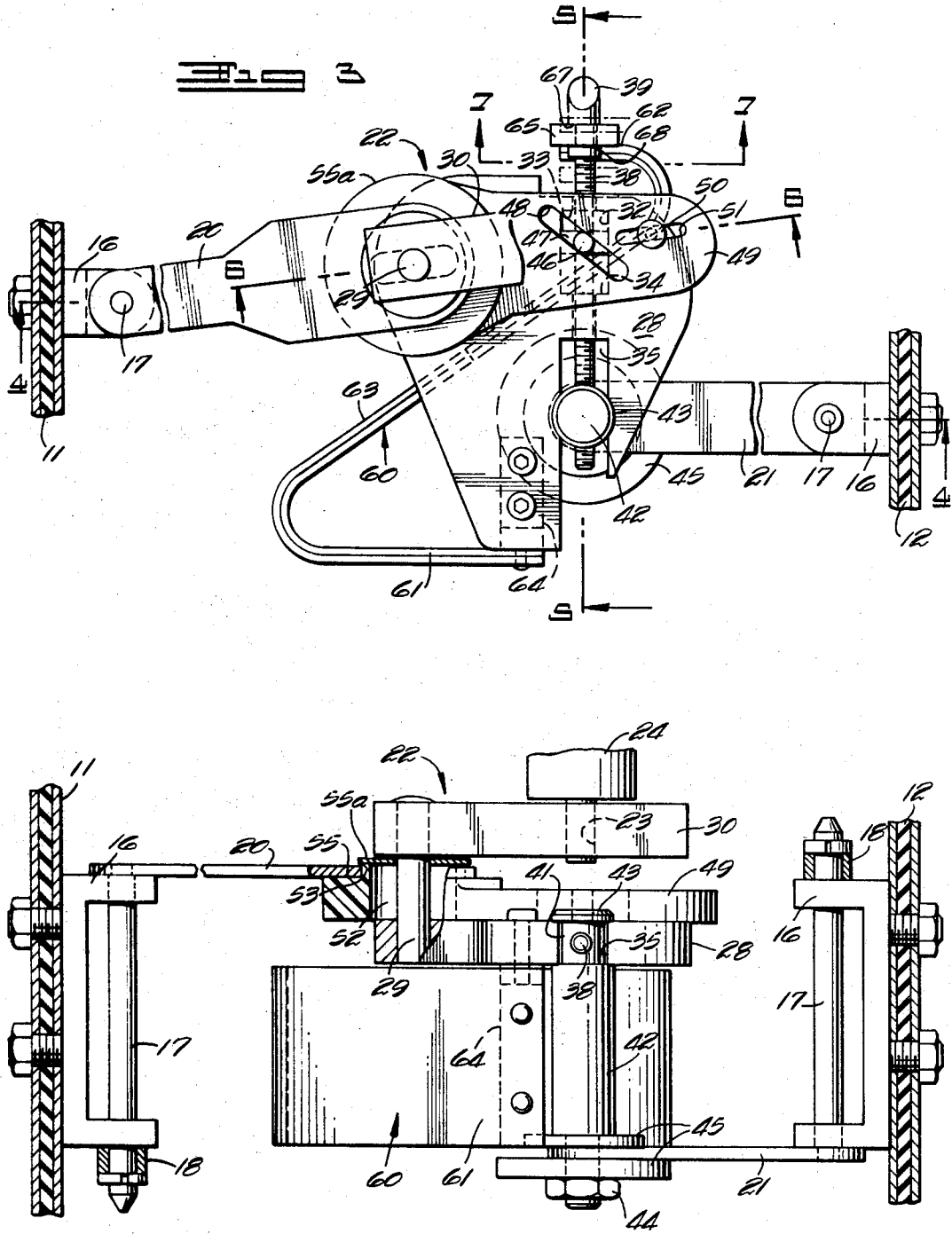

March 5, 1968 P. S. ANDERSON 3,371,532
TEMPERATURE-COMPENSATING CRANK ASSEMBLY FOR GAS METERS
Filed Aug. 17, 1965 3 Sheets-Sheet 3
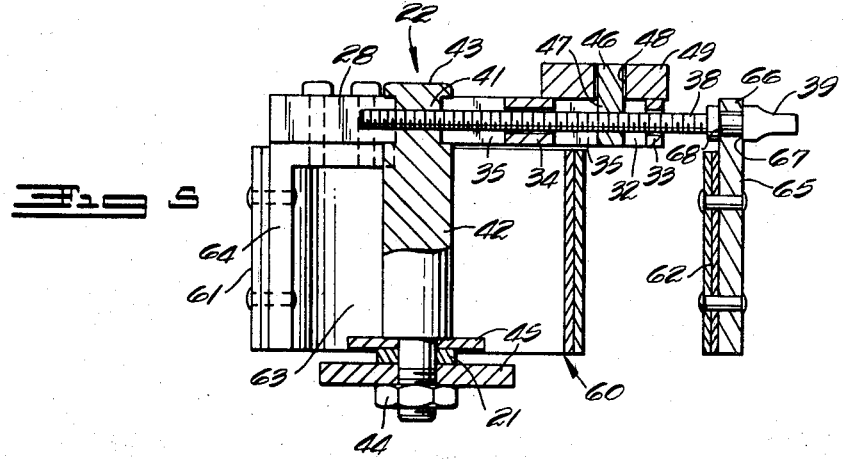
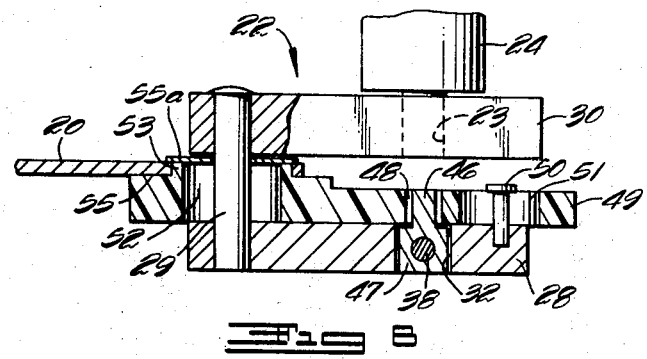
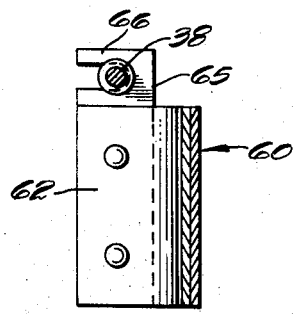
INVENTOR.
PARKER S. ANDERSON
BY MAHONEY, MILLER & RAMBO
BY
ATTORNEYS United States Patent Office 3,371,532
Patented Mar. 5, 1968

3,371,532
TEMPERATURE-COMPENSATING CRANK
ASSEMBLY FOR GAS METERS
Parker S. Anderson, Tempe, Ariz., assignor to Lancaster Meter Company, Tempe, Ariz., a corporation of Arizona
Filed Aug. 17, 1965, Ser. No. 480,399
3 Claims. (Cl. 73—281)

ABSTRACT OF THE DISCLOSURE

A diaphragm-actuated crank mechanism for a gas meter which mechanism includes a thermally-responsive bimetal strip associated with the indexing screw of the crank mechanism and operable automatically to vary the throw of the crank mechanism in response to variations in ambient temperatures.

This invention relates to a crank assembly for gas meters. It has to do, more specifically, with a crank assembly, adapted to be connected with a pair of diaphragms, which is provided both with means for manually adjusting the operating stroke of the diaphragms and thermally-responsive temperature-compensating means for automatically adjusting the operating strokes of the diaphragms. The subject matter of this application is an improvement upon the structure disclosed in the copending application of Charles W. Stewart, Ser. No. 446,189, filed Apr. 7, 1965, entitled Gas Meter Crank Assembly Having Thermally-Responsive Compensating Means.

In recent years, it has become customary to install gas meters out-of-doors where, in areas of changing climate, they are subjected to extreme temperature variations. As is well-known by Charles' Law, the volume of gas changes in direct proportion to changes of temperature of the gas. Thus, a gas meter which is preset or calibrated to measure and indicate the volume of gas passing therethrough at a given temperature, say 60° F., will give an inaccurate measurement or reading at considerably lower or higher temperatures. According to said copending application, it was proposed to equip the crank assembly of a gas meter of the double-diaphragm type with a temperature-compensating means which was operable to change the displacement strokes of both diaphragms simultaneously in accordance with temperature variations. However, in addition to the temperature-responsive means for automatically adjusting the strokes of the two diaphragms, it is desirable to provide manual means for properly balancing the meter, especially in initially calibrating the meter. The bi-metallic temperature-compensating means disclosed in said application was so coupled into the crank assembly that it did not permit the desired manual adjustment to change the crank-throw for both diaphragms simultaneously and equally to permit balancing of the meter.

The present invention overcomes this difficulty by providing the crank assembly with manual adjusting means for sumultaneously adjusting the crank-throw of both diaphragms along with a thermally-responsive, bi-metallic, temperature-compensating, automatic adjusting means which is so connected in the crank assembly that it will permit the manual adjustment for precision balancing.

These and additional objects and advantages of the present invention will become more readily apparent by reference to the following description and the accompanying drawings, wherein:

FIG. 1 is a side elevational view, partially broken away, of a two diaphragm, three chamber gas meter of the type to which the adjusting mechanism of the present invention is applicable;

FIG. 2 is a diagrammatic top plan view showing the pattern of adjustment of the diaphragm pitman links relative to the main drive shaft of the meter;

FIG. 3 is an enlarged horizontal sectional view taken along the line 3—3 of FIG. 1 and showing the adjusting mechanism of this invention;

FIG. 4 is a vertical sectional view taken along the line 4—4 of FIG. 3;

FIG. 5 is a vertical sectional view taken along the line 5—5 of FIG. 3;

FIG. 6 is a vertical sectional view taken along the line 6—6 of FIG. 3; and

FIG. 7 is a vertical sectional view taken along line 7—7 of FIG. 3.

Refering now to the drawings, FIG. 1 illustrates a typical three chamber, two diaphragm, Sprague-type gas meter in which the present, improved crank mechanism is incorporated. The meter, as shown, includes a main casing 10 in which is mounted a pair of opposed, reciprocatory diaphragms 11 and 12. The diaphragms 11 and 12 divide the casing 10 internally into three separate measuring chambers, 13, 14 and 15. Rigidly connected with the central portion of each of the diaphragms 11 and 12 at the inner face thereof is the usual hinge bracket 16. Pivotally connected with the respective hinge brackets 16 are the outer end portions of a pair of diaphragm-actuated pitman links 20 and 21. The inner end portions of the pitman links 20 and 21 are pivotally connected with the present improved crank assembly, which is designated generally by the reference numeral 22 in FIG. 1, and which will be hereinafter described in detail. The pivotal connection at the outer end of each link comprises the hinge pin 17 which is carried by the link end and is disposed in each bracket 16, being held in a fixed axial position therein by means of a collar and spacer unit 18. Due to the nature of the improved crank assembly of this present invention, it is not necessary to provide the usual bent corner wires for supporting and guiding the diaphragms 11 and 12 for back-and-forth reciprocation. The crank assembly 22 is supported upon and is drivingly connected with the lower end of the main drive shaft 23 of the meter. In the usual manner, the drive shaft 23 extends verticaly upwardly through the center chamber 14 of the meter and is journaled for axial rotation in a stationary bearing bracket 24 which depends from and is rigidly supported by the interior framework of the meter, not shown.

As will be readily understood by those skilled in the art, the upper end portion of the drive shaft 23 is connected to drive a gyrating or orbiting valve member, not shown, which is conventionally mounted within the usual distributing chamber defined by a valve casing 25. The valving mechanism, not shown, functions to control the flow of gas to and from the measuring chambers 13, 14, and 15 and the movement of the orbiting valve member is suitably translated by an index drive mechanism, also not shown, to drive the flow-indicating and recording mechanism of the meter which is contained in the register housing or casing 26.

With the exception of the present improved diaphragm-actuated crank assembly 22, the parts of the gas meter, as heretofore described, are conventional and are the same as disclosed in the said copending application, and as such, form no part of the present invention.

The crank assembly 22, as shown best in FIGS. 3–7, comprises a crank plate 28 which is of generally triangular shape and which is supported in a generally horizontal plane for rotation about a vertical axis coincident to the axis of rotation of the main drive shaft 23. The crank plate 28 is nonrotatively connected with and supported by the lower end portion of a crank pin 29 which, in turn, is nonrotatively connected with and supported in depending relation to a crank arm 30 drivingly connected with the lower end of the drive shaft 23. In the usual manner, the crank arm 30 may be provided with an adjustment setscrew mechanism, indicated generally by the reference numeral 31 in FIG. 1, by means of which the crank arm 30 may be rotationally adjusted and indexed on the drive shaft 23.

The crank pin 29 serves to connect the crank plate 28 for rotation as a unit with the crank arm 30 about the axis of the shaft 23, while at the same time, to maintain the plate 28 in vertically spaced, parallel relation to the crank arm 30. The crank plate 28, as shown in FIGS. 3-5, is formed in the area of its axis of rotation with a first, vertically opening, rectangular slot 32 whose long axis extends radially of the axis of rotation of the crank plate 28. The slot 32 is bounded at one end by an edge wall 33 of the plate and at its opposite end by a divider web or wall 34. A second, elongated, rectangular slot 35 is formed in the crank plate 28 in longitudinal alignment with the first slot 32, but is separated from the first slot 32 by the divider wall 34. The walls 33 and 34 of the crank plate 28 are formed with axially aligned openings which rotatively and slidably receive the threaded adjusting screw 38. The adjusting screw 38 extends longitudinally and axially through both of the slots 32 and 35 and is arranged in perpendicular, radial relation to the axis of rotation of the crank plate 28. The screw 38 is provided at its outer end with a flattened actuating knob or handle 39 by which the screw may be manually rotated.

Threadedly engaged with the outer end portion of the adjusting screw 38 is the vertically extending shank portion 41 of a bearing post 42. As will be noted in FIGS. 3 and 5, the diameter of the cylindrical shank portion 41 of the bearing post 42 closely approximates the width of the slot 35, whereby to provide for longitudinal sliding movement of the bearing post 42 within the slot 35 upon axial rotation of the screw 38. The upper end of the post 42 is formed with a peripheral flange 43 which overlies the upper surfaces of the crank plate 28 on either side of the slot 35 and supports the post for sliding movement within the slot. The lower end portion of the bearing post 42 projects a substantial distance below the crank plate 28 and pivotally receives the apertured inner end portion of the pitman link 21. A retaining nut 44 is threaded onto the lower end of the post 42, and a pair of spacer washers 45 are carried on the lower end portion of the post 42 to prevent binding of the link on the post.

Slidably carried within the inner slot 32 of the crank plate 28 is a cam stud 46 which is mounted on the screw 38 for axial movement along the screw. The cam stud 46 is formed with a rectangular, tubular body portion 47 having a threaded opening which rotatably receives and is in engagement with the threaded screw 38. Thus, by rotating the screw 38, the bearing post 42 and the cam stud 46 will simultaneously be moved to the same extent and in the same direction axially of the screw 38.

The cam stud 46, as will be noted in FIGURES 3, 5 and 6, projects upwardly above the upper surface of the crank plate 28 and through a diagonal cam slot 48 formed toward the inner end of a slidable link or arm 49. The arm 49 is mounted for limited sliding movement on the upper surface of the crank plate 28 by means of a headed guide pin 50 carried by the crank plate and extending upwardly through an elongated guide slot 51 formed longitudinally in the inner end portion of the arm 49. Additionally, the outer end portion of the arm 49 is formed with an elongated, longitudinally disposed guide slot 52 which slidably embraces the crank pin 29. The longitudinal axis of the arm 49 is disposed radially of the axis of rotation of the crank plate 28 and in approximately 80° angular relation to the axis of the screw 38.

The outer end of the link or arm 49 is formed or otherwise provided with an annular, upstanding bearing post or collar 53, as shown best in FIGURES 4 and 6. The bearing collar 53 projects upwardly from the arm 49 in the space between the crank plate 28 and the crank arm 30, and is formed with an enlarged axial bore having a diameter approximately equal to the length of the slot 52 formed in the arm 49. Thus, the bearing collar 53 is movable bodily with the arm 49 radially inwardly and outwardly with respect to the axis of rotation of the crank plate 28. Additionally, the bearing collar 53 is formed on its outer periphery with a stepped shoulder portion 55, and the inner, apertured end of the opposite pitman link 20 is pivotally engaged with the collar 53 above the shoulder portion 55. An annular washer 55a is carried on the crank pin 29 between the upper edge of the collar 53 and the outer end of the crank arm 30.

As previously indicated, this invention provides a temperature compensating means in the crank assembly 22 to adjust the assembly automatically in accordance with temperature variations to change the displacement stroke of both diaphragms 11 and 12, whereby to compensate for variations in volume brought about by temperature changes in accordance with Charles' Law. This compensating means may take the form of a bi-metallic strip which is indicated generally at 60 in FIGS. 3-5 and 7. The strip 60 is shown as being of substantially Z-form and its opposite ends are operatively connected respectively to the crank plate 28 and the adjusting screw 38. Thus, the bi-metallic strip 60 is of substantial width or height and is disposed on edge, being located below the crank plate 28. The strip 60 has the straight end portions 61 and 62 which are connected by the angled portion 63 and are normally in parallel relationship. The extremity of the end portion 61 is riveted or otherwise rigidly secured to an inverted L-shaped bracket 64 which depends from and is rigidly attached to the crank plate 28. The extremity of the end portion 62 is riveted or otherwise attached to a plate or bracket 65 (FIG. 7) which has a notched or bifurcated upper extremity 66 that straddles the screw 38 adjacent its outer end. The screw 38 just inwardly of the knob 39 is provided with axially spaced stop shoulders 67 and 68 (FIG. 5) located at opposite sides of the extremity 66.

It will be apparent that the bi-metallic strip 60 is of substantial structure and has its one end 61 anchored to the crank end 28 while its other end 62 has the outer end of the screw 38 rotatably mounted thereon. This crank assembly 22, therefore, provides means for supporting the pitman links 20 and 21 at their junction with the crank assembly rather than at the hinge brackets 16 and, therefore, it is not necessary to provide supporting carrier wires at such hinge brackets. The thermal or bi-metallic strip elements 60 will hold the adjusting screw 38 at a fixed axial position at a constant temperature but will automatically move it axially in response to temperature variations. The length of crank throw can be initially precision-balanced so that the valve timing can be correctly set during meter calibration at any desired temperature. This is accomplished by rotating the adjusting screw 38 which will move the pivot 42 axially of the screw and radially of the drive shaft 23 and simultaneous radial adjustment of the pivot 53 will occur as indicated in FIG. 2, due to the axial movement of the cam stud 46 along the screw and its engagement with the cam slot 48 in the arm 49. It is here important to note that the desired angular spacing (80°) of the bearing posts 42 and 53 with respect to the axis of rotation of the crank assembly, is maintained at all times regardless of the radially adjusted positions of the posts 42 and 53. This is extremely desirable, in order to prevent a change of timing in the strokes of the diaphragms which would otherwise occur with a change in the relative angular positions of the bearing posts. As previously indicated, rotational adjustment of the screw 38 is provided solely for the purpose of initially indexing or presetting the radial position of the bearing post 42 with respect to the axis of rotation of the crank assembly. In other words, once the screw 38 has been rotatively adjusted to adjust the stroke of the diaphragm 12 in relation to the stroke of the opposite diaphragm 11, then the present crank assembly is in condition for automatic adjustment by the bi-metal element 60 in response to temperature variations.

The simultaneous adjustment of the diaphragm strokes is indicated diagrammatically in FIG. 2 of the drawings, wherein it will be noted that the bearing post 42 and the bearing collar 53 are movable simultaneously radially inwardly and outwardly of the axis of rotation of the crank plate 28, as defined by the axis of rotation of the drive shaft 23. The linear paths of adjustment of the bearing post 42 and the bearing collar 53 are disposed in acute angular relation and define an included angle of approximately 80°. Thus, it will be seen that the rotational angle between the bearing post 42 and the bearing collar 53 remains constant regardless of the adjusted position of the post and collar.

The bi-metal strip 60 is formed and arranged so as to index or maintain the crank link pivots 53 and 42 in a predetermined position on the plate 28 when the ambient temperature is at a given norm, say, for example, 60° F. However, as the ambient temperature changes, the radial positions of these pivots relative to the axis of rotation of the crank plate will be simultaneously adjusted and to the same extent. With a decrease in temperature, the strip will deflect in such a manner that the end 62 will move the screw 38 axially bodily (FIG. 3) to cause the pivot 42 to move radially outwardly relative to the axis of rotation of the crank plate 28. Simultaneously, the cam stud 46 is moved axially with the screw and causes the plate or arm 49 to move the pivot 53 radially outwardly relative to the axis of rotation of the cam plate 28 to the same extent as the movement of the pivot 42 due to the simultaneous movement of the pivot 42 and the cam stud 46 to the same extent with the screw in the direction of its axis. An increase in temperature will cause a reverse radial movement of the pivots 42 and 53 simultaneously to the same extent. This radial movement of the crank pivots 42 and 53 in response to thermal deflection of the bi-metal strip 60, results in a proportional variation of the strokes of the diaphragms 11 and 12 so as to displace a greater or lesser volume of gas through the chambers 13, 14 and 15 of the gas meter. The moving force exerted by the bifurcated extremity 66 on the outer end of the screw 38 will ordinarily be in a substantially axial direction but limited radial movement of the bifurcated end relative to the screw will be permitted, if necessary, to avoid binding.

It will be apparent from the above that this invention provides a mechanically simple, yet highly efficient, diaphragm-actuated crank assembly for a three-chamber gas meter which provides for the simultaneous and proportional adjustment of the throw arms of the crank assembly both in the initial balancing of the meter and automatically in response to temperature variations. The screw adjusting means provides for the initial setting of the crank link pivots and the thermally-responsive means is so connected to the screw that it repositions those pivots as necessary to compensate for temperature variations.

While a single preferred embodiment of the invention has been illustrated and described in detail, it will be manifest that various modifications as to details of construction and design may be resorted to without departing from the spirit of the invention or the scope of the following claims.

Having thus described this invention, what is claimed is:

1. In a diaphragm-actuated crank assembly of a gas meter; a crank plate rotatable about a substantially vertical axis; a threaded adjusting screw rotatably and slidably carried by said crank plate and disposed in radial, intersecting relation to the axis of rotation of said crank plate; a first bearing post slidably carried by said crank plate in eccentric relation to the axis of rotation of said plate and threadedly engaged with said screw; a first diaphragm-actuated link pivotally connected with said first bearing post; a stud member threadedly engaged with said screw inwardly of said bearing post, an arm slidably carried on said crank plate and having a longitudinal axis disposed in angularly offset relation to the axis of said screw and in radial intersecting relation to the axis of rotation of said crank plate, said arm being formed with a diagonal slot embracing said stud member and being movable radially inwardly and outwardly with respect to the axis of rotation of said crank plate to vary the radial position of said first bearing post with respect to the axis of rotation of said crank plate; a second bearing post rigidly carried by and movable with said arm and disposed in eccentric relation to the axis of rotation of said crank plate and in rotationally spaced relation to said first bearing post; a second diaphragm-actuated link pivotally connected with said second bearing post, and a bi-metallic strip having one end anchored to said crank plate and an opposite end connected to said screw and operable to move said screw axially in response to temperature variations.

2. The combination of claim 1 in which the bi-metallic element is substantially Z-shaped with substantially parallel end portions, one of the end portions being rigidly connected to said crank plate and the other end portion supporting said screw for axial rotation.

3. The combination of claim 2 in which the last-named end portion has a bifurcated outer extremity which engages said screw between axially fixed shoulders.

References Cited
UNITED STATES PATENTS

| | | | |
|---|---|---|---|
| 2,296,485 | 9/1942 | Whitworth | 73—281 |
| 2,753,712 | 7/1956 | Douglas | 73—281 |
| 3,177,713 | 4/1965 | Hutchison et al. | 73—281 |
| 3,177,714 | 4/1965 | Mayeran | 73—281 |

RICHARD C. QUEISSER, *Primary Examiner.*

JAMES GILL, *Examiner.*

EDWARD D. GILHOOLY, *Assistant Examiner.*